United States Patent [19]
Brown et al.

[11] Patent Number: 5,969,971
[45] Date of Patent: *Oct. 19, 1999

[54] APPARATUS AND METHOD FOR THERMAL NORMALIZATION IN THREE-DIMENSIONAL ARTICLE MANUFACTURING

[75] Inventors: Robert B. Brown, Duncan; Charles F. Kirschman, Central; Herbert E. Menhennett, Easley, all of S.C.

[73] Assignee: BPM Technology, Inc., Greenville, S.C.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/709,688

[22] Filed: Sep. 9, 1996

Related U.S. Application Data

[63] Continuation of application No. 08/326,009, Oct. 19, 1994, Pat. No. 5,572,431.

[51] Int. Cl.[6] .................................................. G06F 19/00
[52] U.S. Cl. ..................... 364/468.26; 264/40.1; 364/468.01
[58] Field of Search ............... 364/468.01, 468.02, 364/468.03, 468.04, 468.24–468.27, 474.24, 474.05, 474.08, 475.01; 395/118–120; 264/40.1, 479, 241, 304, 308; 425/135, 375; 345/419, 420

[56] References Cited

U.S. PATENT DOCUMENTS

| | | | |
|---|---|---|---|
| 4,575,330 | 3/1986 | Hull | 425/174.4 |
| 4,665,492 | 5/1987 | Masters | 364/468 |
| 4,749,347 | 6/1988 | Valavaara | 425/135 |
| 5,031,120 | 7/1991 | Pomerantz et al. | 364/522 |
| 5,038,014 | 8/1991 | Pratt et al. | 219/121.64 |
| 5,059,266 | 10/1991 | Yamane et al. | 156/64 |
| 5,121,329 | 6/1992 | Crump | 364/468 |
| 5,126,529 | 6/1992 | Weiss et al. | 219/121.6 |
| 5,128,235 | 7/1992 | Vassiliou et al. | 430/322 |
| 5,134,569 | 7/1992 | Masters | 364/474.24 |
| 5,136,515 | 8/1992 | Helinski | 364/468 |
| 5,140,937 | 8/1992 | Yamane et al. | 118/695 |
| 5,141,680 | 8/1992 | Almquist et al. | 264/22 |
| 5,149,548 | 9/1992 | Yamane et al. | 425/174.4 |
| 5,192,559 | 3/1993 | Hull et al. | 425/89 |
| 5,204,124 | 4/1993 | Secretan et al. | 425/145 |
| 5,207,371 | 5/1993 | Prinz et al. | 228/125 |
| 5,216,616 | 6/1993 | Masters | 364/474.24 |
| 5,257,657 | 11/1993 | Gore | 164/46 |
| 5,260,009 | 11/1993 | Penn | 264/40.1 |
| 5,287,435 | 2/1994 | Cohen et al. | 395/118 |
| 5,301,415 | 4/1994 | Prinz et al. | 29/458 |
| 5,301,863 | 4/1994 | Prinz et al. | 228/33 |
| 5,303,141 | 4/1994 | Batchelder et al. | 364/149 |
| 5,340,433 | 8/1994 | Crump | 156/578 |
| 5,402,351 | 3/1995 | Batchelder et al. | 364/468 |
| 5,572,431 | 11/1996 | Brown et al. | 364/468.01 |
| 5,594,652 | 1/1997 | Penn et al. | 364/468.26 |

FOREIGN PATENT DOCUMENTS

| | | |
|---|---|---|
| 0 420 614 | 4/1991 | European Pat. Off. . |
| 0 606 627 | 7/1994 | European Pat. Off. . |
| 92/08200 | 5/1992 | WIPO . |
| 92/18323 | 10/1992 | WIPO . |
| 95/05943 | 3/1995 | WIPO . |

*Primary Examiner*—William Grant
*Assistant Examiner*—Steven R. Garland
*Attorney, Agent, or Firm*—Allen, Dyer, Doppelt, Milbrath & Gilchrist, P.A.

[57] ABSTRACT

A method and apparatus for forming a three-dimensional article includes dispensing build material and thermally normalizing predetermined portions thereof at predetermined intervals during construction of the article. The thermal energy may be provided by a heated body advanced adjacent to or in contact with the surface portions. Thermal energy may also be supplied by a radiation source. The thermal normalization may be performed after a predetermined number of successive layers are dispensed. Related methods are also disclosed.

27 Claims, 7 Drawing Sheets

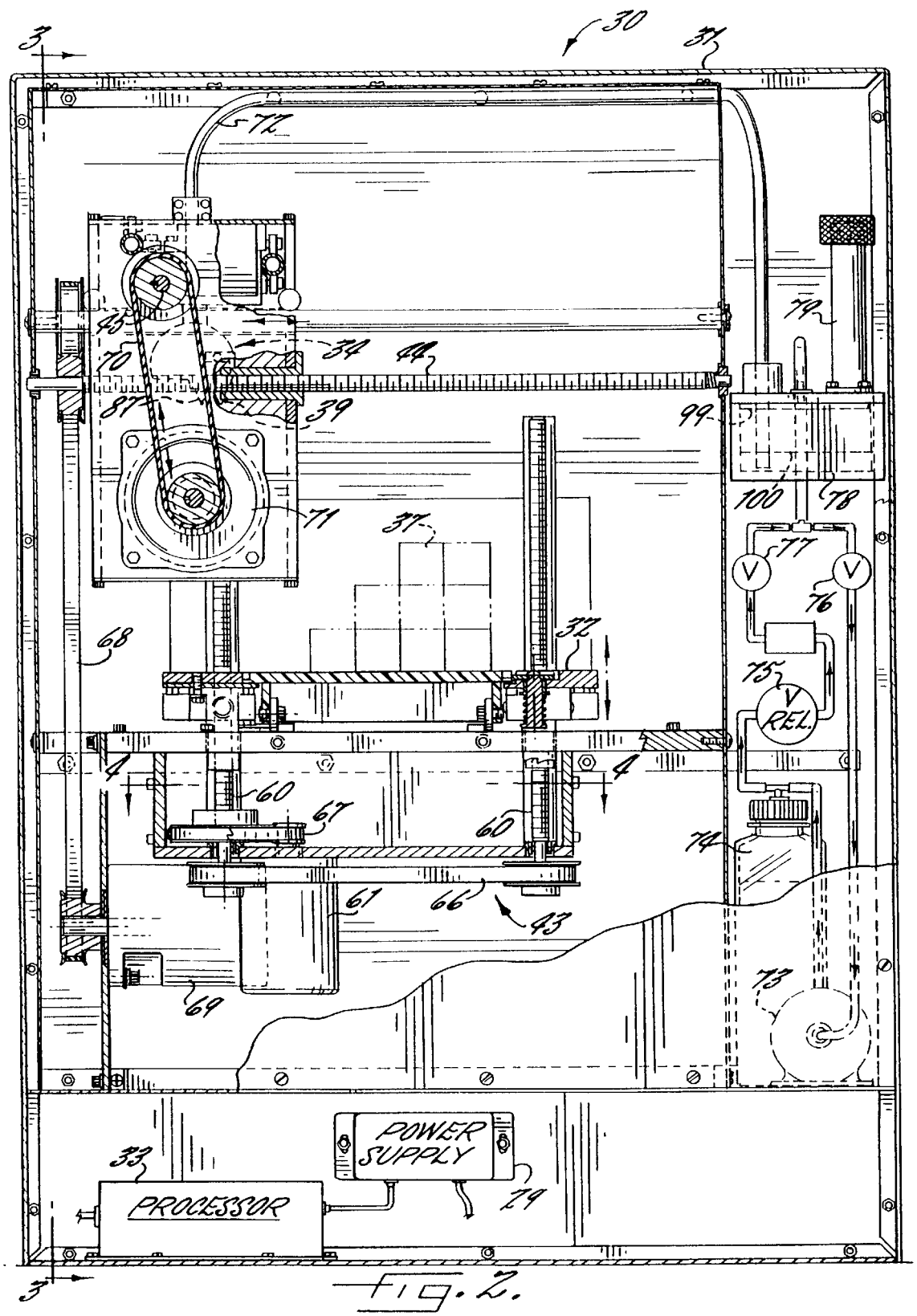

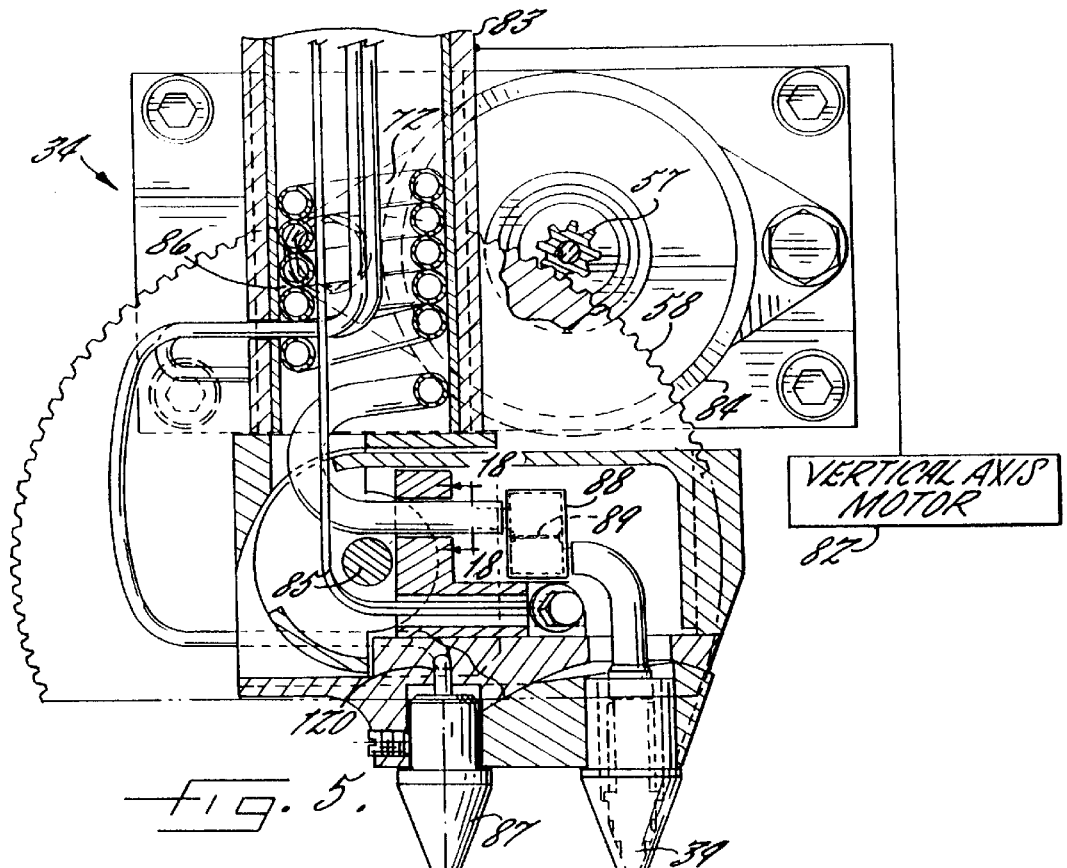
_Fig. 5._
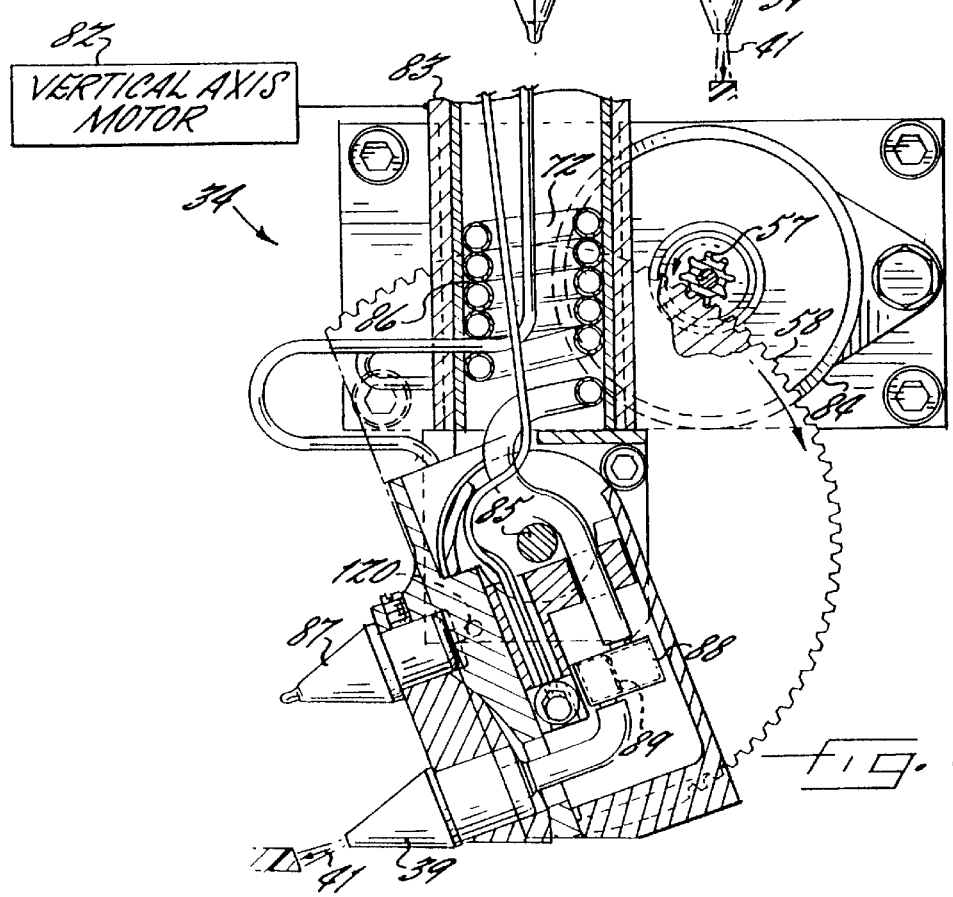
_Fig. 6._

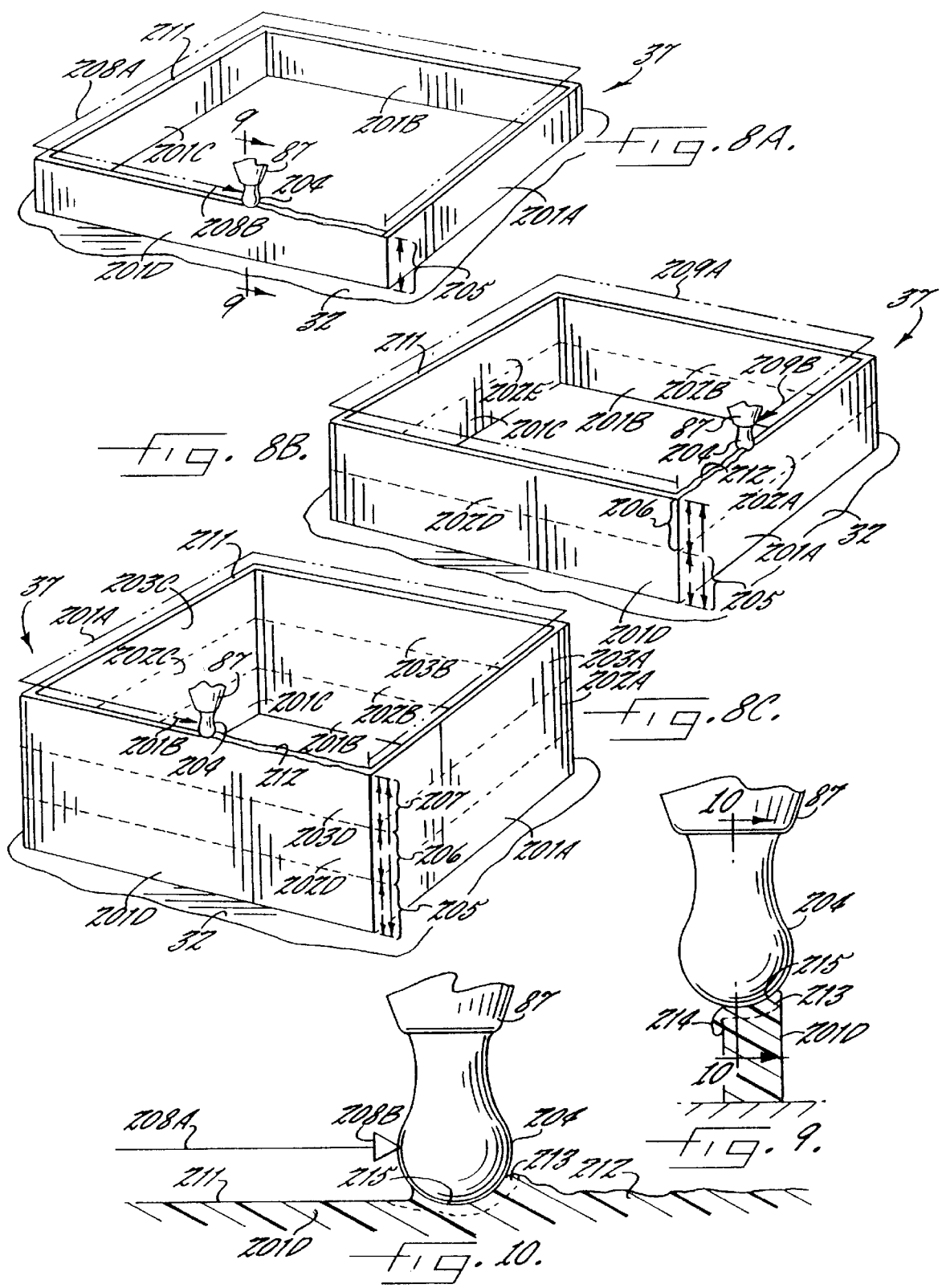

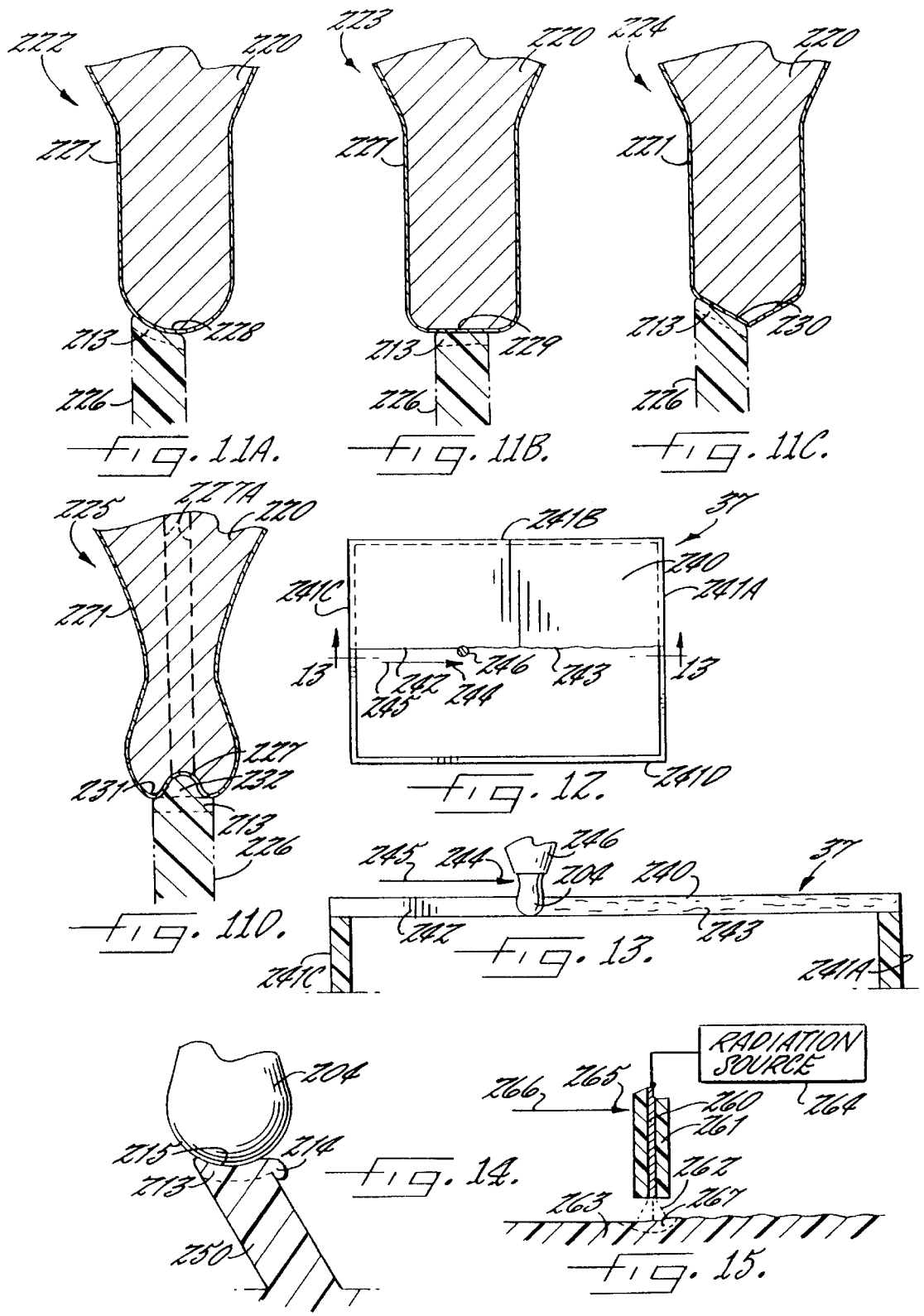

APPARATUS AND METHOD FOR THERMAL NORMALIZATION IN THREE-DIMENSIONAL ARTICLE MANUFACTURING

This application is a continuation of application Ser. No. 08/326,009 filed on Oct. 19, 1994 now U.S. Pat. No. 5,572,431.

FIELD OF THE INVENTION

The invention relates to an apparatus and a method for forming a three-dimensional article, and, more particularly, to normalizing surface portions of the article during manufacturing.

BACKGROUND OF THE INVENTION

In the manufacture of a three-dimensional article, it is common practice to first create a design of the article and then produce a prototype. After reviewing the initial design and prototype, design revisions are often made requiring the production of yet another prototype. This process of review and redesign may be repeated a number of times before finding the optimum design, thereby requiring that one or more prototypes be produced. Accordingly, the process of designing and prototyping an article may involve a considerable expense of time, effort and money.

Computer aided design (CAD) systems are commonly used for automating the design process. With the aid of a computer, an operator is able to design a three-dimensional article and display the design on a two-dimensional medium such as a display screen or paper. The computer aids in the design as called for by the operator according to pre-existing design parameters and computer software.

Computer aided milling machines for milling articles in response to computer generated signals are also commonly used to make certain articles. In these machines, a computer generated data file representative of the article to be produced is used to control the operation of the machine. Milling tools within the machine shape a body of material. Relatively coarse tools may be used to shape coarse features of the article, while finer tools may be used to finish the article. These machines, however, are relatively large, expensive and limited in the article geometries that may be produced.

Accordingly, systems have been developed wherein a three-dimensional article is constructed in successive layers based upon three-dimensional CAD data. For example, stereolithography has been one approach to the problem of producing a prototype of an article layer by layer. An example of stereolithography is disclosed in U.S. Pat. No. 4,575,330 to Hull entitled "Apparatus for Production of Three-Dimensional Objects By Stereolithography." Hull discloses an apparatus whereby articles are produced by forming successive, adjacent, cross-sectional laminae of the article at the surface of a fluid medium. The fluid medium is capable of altering its physical state from a fluid to a solid in response to stimulation, such as by UV radiation; particle bombardment, such as electron beams; chemical reaction; or impinging radiation other than UV radiation. The apparatus includes a source of stimulation which may be selectively applied to the surface of the fluid medium to produce the cross-sectional laminae of the article. The source of selective stimulation is controlled by a computer in response to coordinate data.

Stereolithography, however, requires the use of more material than is actually incorporated in the article being produced, and also requires the exact placement of the article being constructed relative to the surface of the fluid medium. In addition, the depth of the layer created when the fluid surface is exposed to the stimulation may be difficult to control.

An apparatus and method for forming three-dimensional articles from a material which is normally solid but flowable when heated is disclosed in U.S. Pat. No. 5,141,680 to Almquist et al. entitled "Thermal Stereolithography." This patent discloses a conventional stereolithography apparatus employing a container of material capable of physical transformation from a fluid to a solid upon exposure to synergistic stimulation. The patent also discloses recoating means including a doctor blade to rapidly coat fresh layers of resin prior to exposing the layer to the synergistic stimulation.

Another modeling system including a moveable table positioned in a photohardenable substance, and including a doctor knife for periodic vertical leveling is disclosed in U.S. Pat. No. 5,128,235 to Vassiliou et al. entitled "Method of Forming a Three-Dimensional Object Comprising Additives Imparting Reduction of Shrinkage To Photohardenable Compositions."

U.S. Pat. No. 5,260,009 to Penn entitled "System, Method, and Process for Making Three-Dimensional Objects" discloses a system wherein an object is formed in successive layers. A positive material is dispensed in layers to form the object, and a mold material is dispensed around each layer of positive material to provide support. A cutting device is arranged to plane the uppermost surface of the positive material to expose the positive material and to compensate for surface height variations.

U.S. Pat. No. 5,126,529 to Weiss et al. entitled "Method and Apparatus for Fabrication of Three-Dimensional Articles by Thermal Spray Deposition" discloses a system wherein a milling or grinding tool is used to assure that a uniform, constant and repeatable thickness of material is deposited each layer.

A modeling system including an extrusion head is disclosed in U.S. Pat. No. 4,749,347 to Valavaara entitled "Topology Fabrication Apparatus." This patent discloses a system that progressively extrudes and deposits portions of a three-dimensional solid body. This patent also discloses a gate or doctor blade that may be tilted to define the angle of slope along the upper edge of the extruded strip. Similarly U.S. Pat. No. 5,121,329 to Crump entitled "Apparatus and Method for Creating Three-Dimensional Objects" discloses an apparatus wherein a flow of material through a nozzle is used to create a three-dimensional object. The bottom flat face of the nozzle provides a doctor blade effect as the nozzle and substrate are moved relative to one another. By surface contact with the layer of material as it is being dispensed, the dispenser tip limits the top of each layer to the precise vertical or z-axis setting, and thus assists in regulating the thickness of each layer to reduce accumulated error along the z-axis.

A major advance in the art of three-dimensional modeling is disclosed in U.S. Pat. No. 4,665,492 to Masters entitled "Computer Automated Manufacturing Process and System." This patent discloses an apparatus including: an ejection head having an ejection nozzle for emitting small mass particles or droplets of particulate matter; a servo-mechanism for manipulating the ejection head and nozzle; and a machine controller for controlling the servo-mechanism in response to a data file containing coordinate information representing the design of the article being produced. The mass particles are directed to the precise coordinates of a three-dimensional article as defined by the computer data file. The mass particles may include plastic material, a slurry material having water content, and charged particles which are electrically deflected. The disclosure of Masters, however, does not directly address the problem of reducing uneven surface portions resulting from a possible accumulation of small uneven portions in each layer of particles.

Other U.S. patents related to three-dimensional modeling are listed as follows: U.S. Pat. No. 5,257,657 to Gore; U.S. Pat. No. 5,136,515 to Helinski; U.S. Pat. No. 5,059,266 to Yamane et al.; U.S. Pat. No. 5,140,937 to Yamane et al.; U.S. Pat. No. 5,149,548 to Yamane et al.; U.S. Pat. No. 5,207,371 to Prinz et al.; U.S. Pat. No. 5,301,415 to Prinz et al.; U.S. Pat. No. 5,301,863 to Prinz et al.; U.S. Pat. No. 5,204,124 to Secretan et al.; U.S. Pat. No. 5,303,141 to Batchelder et al.; U.S. Pat. No. 5,031,120 to Pomerantz et al.; and U.S. Pat. No. 5,287,435 to Cohen et al.

SUMMARY OF THE INVENTION

In view of the foregoing background, it is therefore an object of the present invention to provide a method and apparatus for making an accurate three-dimensional article in successive layers and based upon article defining data.

This and other objects, features, and advantages of the present invention are provided by an apparatus for making a three-dimensional article and including thermal normalizing means for heating and displacing dispensed build material at predetermined intervals during construction of the article. Accordingly, the dimensional accuracy of the article can be greatly increased during construction and in the final article. In preferred embodiments, the build material is dispensed to intentionally overbuild the article. Accordingly, the thermal normalizing means is preferably operated at predetermined intervals, such as after a predetermined number of layers of build material are dispensed.

The thermal normalizing means in one embodiment preferably includes a heater and a body connected thereto. Accordingly, the heated body may be advanced along predetermined portions of dispensed build material to melt and displace dispensed build material. In one embodiment, the thermally conductive body has a predetermined shape for forming a corresponding shape on the dispensed build material. Thus, the surface portion of the article can be shaped as well as normalized. The contact surface of the body may also include a release coating thereon to prevent the melted build material from adhering to and accumulating thereon.

The apparatus also preferably includes a platform, and build material dispensing means positioned adjacent the platform for dispensing a build material on the platform. The dispensing means may be means for ballistically jetting a plurality of droplets of melted build material. The build material solidifies after dispensing to construct the article in successive layers based upon the article defining data. The thermal normalizing means is positioned adjacent the platform and preferably includes positioning means for advancing the body along a predetermined path of travel adjacent to or in contact with predetermined portions of dispensed build material. The positioning means may include means for moving the body in three directions or dimensions, and means for rotating the body about two axes relative to the platform thereby defining five degrees of freedom of movement. Accordingly, the positioning means allows normalization of a portion of the wall extending in directions other than just vertical and provides other advantages as well.

The apparatus also preferably includes a processor operatively connected to the build material dispensing means and the positioning means for controlling the same. The processor may include means for controlling the positioning means so that the body is advanced in alternating directions in successive operations to increase uniformity. In addition, the processor preferably includes means for controlling the positioning means to advance the body to direct displaced melted build material to a predetermined side of a portion of the article being constructed.

The processor may also preferably include means for controlling the positioning means to withdraw the body from a predetermined portion of dispensed build material to deposit a bead of melted build material carried by the body onto the predetermined portion of dispensed build material. For example, the bead of build material may be deposited at an inside corner portion to define a reinforcing gusset for the corner.

The body may have a contact surface with a generally bulbous shape for contacting the predetermined portions of dispensed build material. Alternatively, the body may have a tubular end portion defining a channel or recess for contacting the dispensed build material and collecting a portion of the melted build material. In yet another variation, the body may have a contact surface with a predetermined shape for forming a corresponding shape on the dispensed build material. This predetermined shape of the contact surface can be planar and generally perpendicular to an axis defined by a cylindrical body, or planar and canted at a predetermined angle from perpendicular to an axis defined by the cylindrical body.

In another embodiment of the present invention, the thermal normalizing means may provided by a radiation source which can be connected to an fiber may be moved along a desired path to heat and melt predetermined surface portions as the article is being constructed.

The dispensing means may be ballistic jetting means for jetting a plurality of droplets of build material. The build material solidifies after dispensing to construct the article in successive layers based upon the article defining data.

A method for making a three-dimensional article based upon article defining data according to another aspect of the invention includes the step of: dispensing a build material upon a platform, wherein the build material solidifies after dispensing to construct the article in successive layers based upon the article defining data; and heating the dispensed build material such as to normalize portions of the article at predetermined intervals during construction of the article.

Heating the dispensed build material at predetermined intervals may have additional benefits in addition to dimensionally normalizing the article during construction. For example, heating may serve to weld the material to create a stronger article. Minor imperfections, such as cracks, may be removed by heating. Surface roughness may be removed by heating and displacing the dispensed build material. In addition, rheological or chemical characteristics of the article may also be changed by the periodic heating of the article during construction. Portions of the article may also be removed by heating and displacement, such as to facilitate construction of an underlying or otherwise shadowed portion of the article.

BRIEF DESCRIPTION OF THE DRAWINGS

FIG. 2 is a sectional view of the apparatus taken along lines 2—2 of FIG. 1.

FIG. 5 is a greatly enlarged side view, partially in section, of a portion of the apparatus according to the invention illustrating the build material jet head positioned to have a vertical firing direction.

FIG. 6 is a greatly enlarged side view, partially in section, of a portion of the apparatus according to the invention illustrating the build material jet head positioned to have a horizontal firing direction.

FIGS. 8A–8C are perspective views of an article being constructed and illustrating thermal normalization according to the present invention.

FIG. 9 is an enlarged cross-sectional view taken along lines 9—9 of FIG. 8A.

FIG. 10 is a cross-sectional view taken along section lines 10—10 FIG. 9.

FIGS. 11A–11D are cross-sectional views of respective embodiments of contact bodies having contact surfaces with various shapes according to the present invention.

FIG. 12 is a plan view of a partially completed horizontal wall of an article illustrating the thermal normalization of the horizontal wall according to the present invention.

FIG. 13 is a cross-sectional view taken along lines 13—13 of FIG. 12.

FIG. 14 is a cross-sectional view illustrating the thermal normalization of a wall portion of an article that is canted at an angle relative to vertical.

FIG. 15 is a schematic side cross-sectional view of a portion of an alternative embodiment of the apparatus including a radiation source and an optical fiber.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
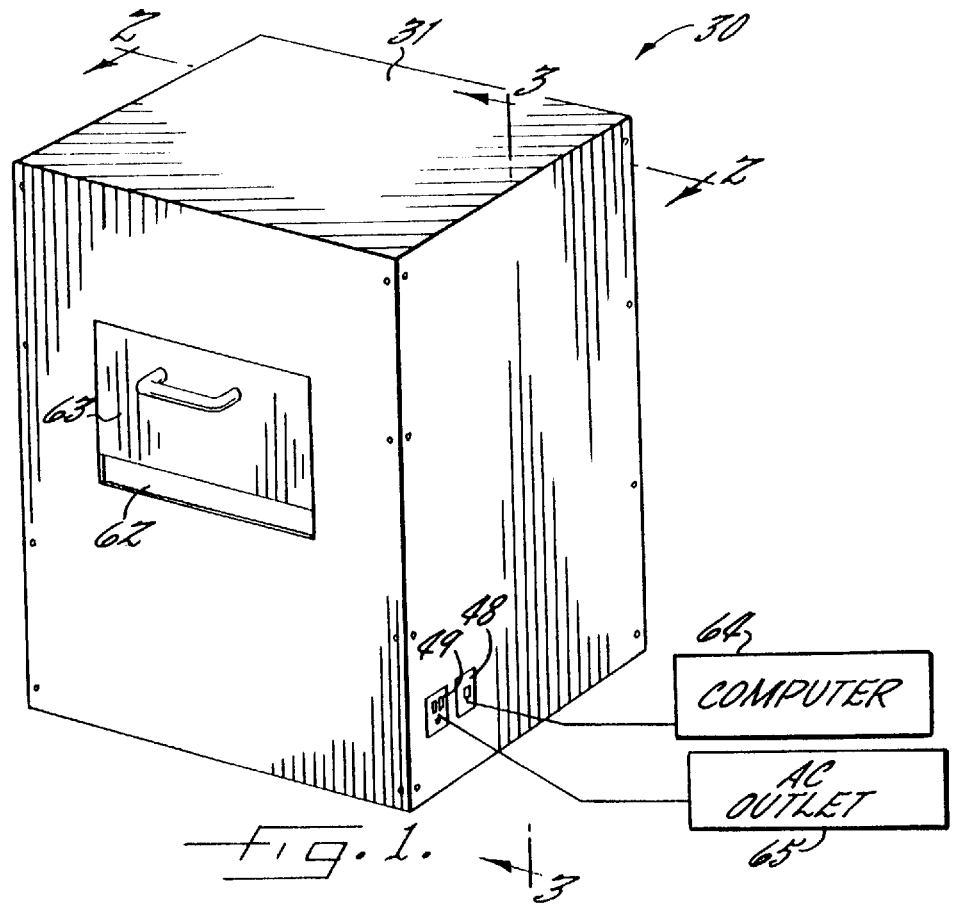
FIG. 1 is a perspective view of the apparatus for forming three-dimensional articles according to the invention.
Figure 4:
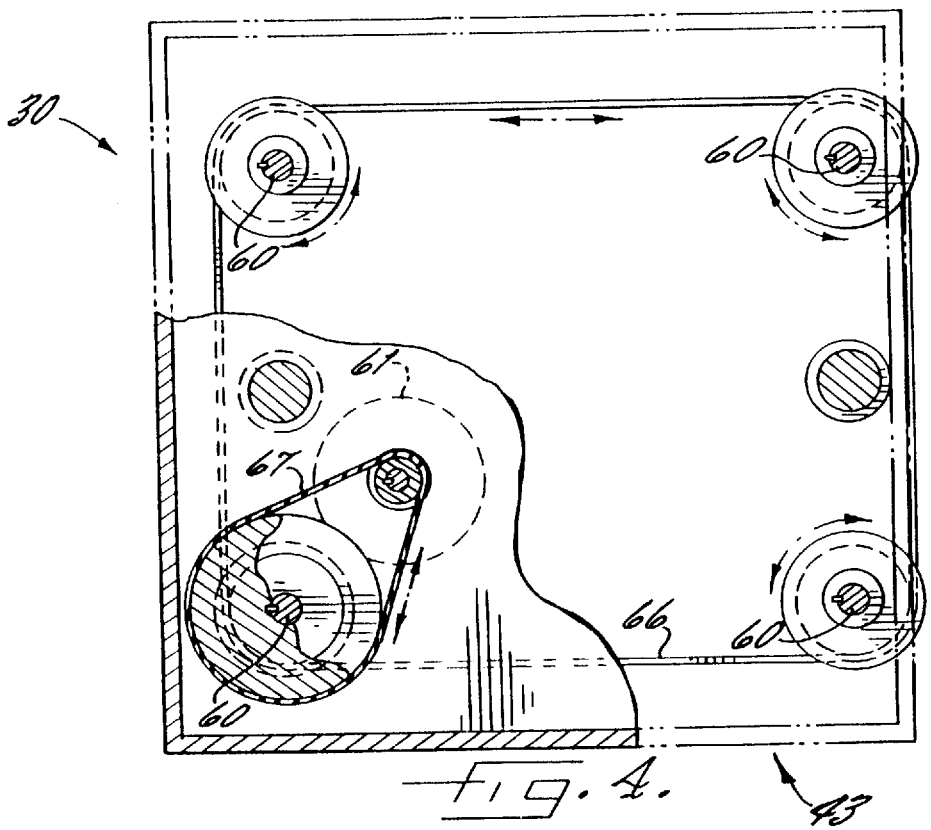
FIG. 4 is a sectional view of the apparatus taken along lines 4—4 of FIG. 2.

As illustrated in FIG. 1, the three-dimensional article manufacturing apparatus 30 according to the invention includes a generally rectangular housing 31. The housing includes an access opening 62 closed by a sliding door 63. A power port 49 facilitates electrical connection to an external power source such as from an AC outlet 65 shown in schematic form. A computer port 48 allows connection to an external computer 64 also shown in schematic form. An external computer 64, such as a work station or personal computer, is used to generate a digital data file containing the article defining data corresponding to an article or model to be built. For example, the data may be from an STL file which defines the article in triangular facets, as would be readily understood by those skilled in the art.

In addition, it will be understood by those having skill in the art that the data file may be transferred to the modeling apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferrable memory medium.

As illustrated in FIG. 2, the apparatus 30 includes a processor 33 which receives the digital data file and translates the article defining data to control signals, as described further herein. The apparatus 30 also includes a power supply 29.

Figure 7:
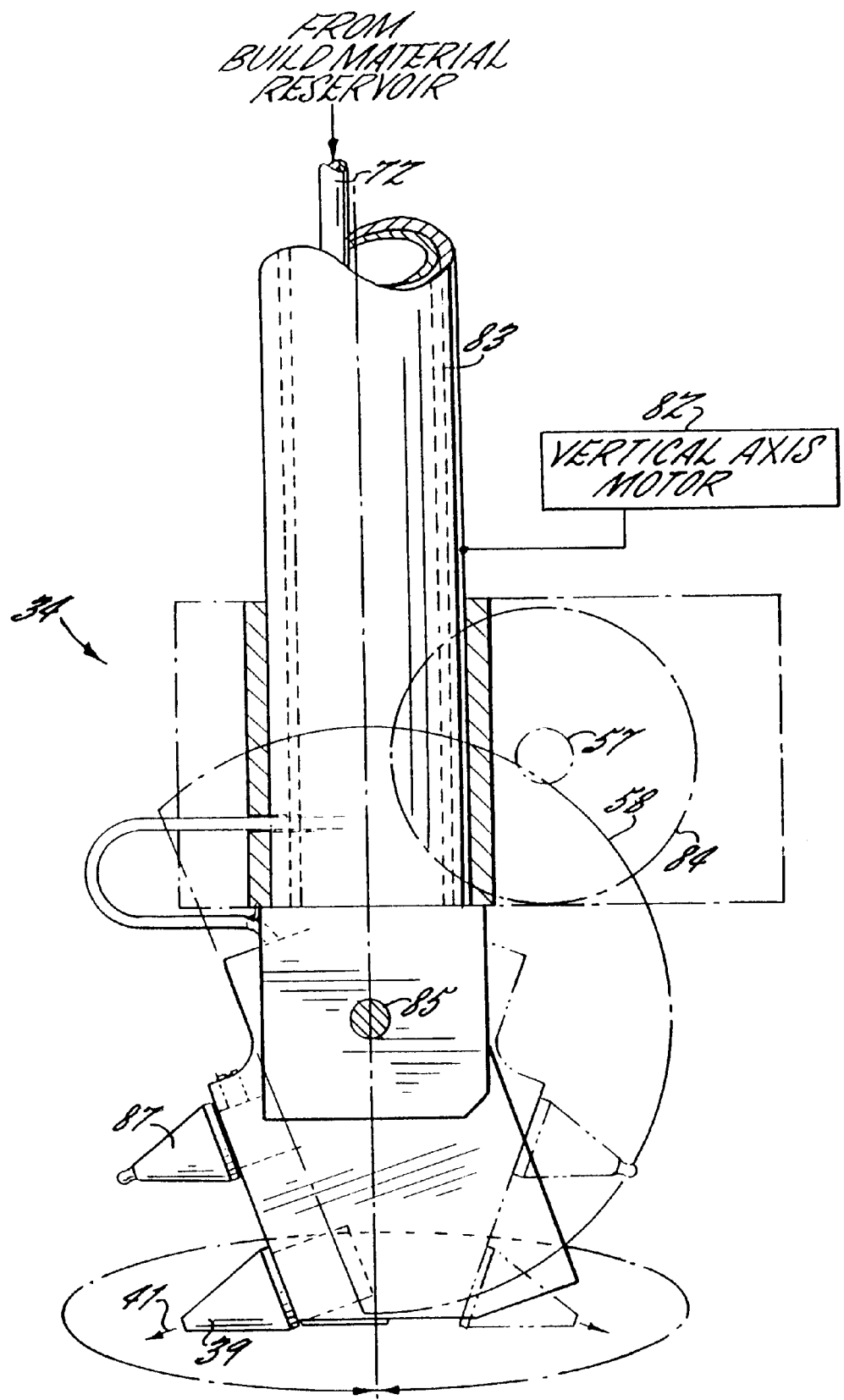
FIG. 7 is a schematic side view of the build material jet head as shown in FIGS. 5 and 6 illustrating rotation about a vertical axis.

The apparatus 30 includes a platform 32 on which the article 37 is built, and a ballistic jetting head 34 (FIGS. 5–7). Droplets of liquid build material are ballistically jetted from a piezoelectric jet 39 carried by jetting head 34 to the platform 32 to construct the article 37. The build material is normally solid when at the temperature of the interior of the apparatus. The build material is heated to maintain the build material in a liquid state. Accordingly, heated liquid droplets of build material are jetted from the jetting head 34 to an intended landing position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position. Moreover, the term droplet as used herein is intended to cover individual or discrete volumes of build material that may be ejected, for example, by the piezoelectric jet 39. In addition, the term droplet is also intended to cover a volumetrically modulated stream of build material, wherein small quantities or volumes of build material may be connected to adjacent volumes without becoming discrete entities, such as because of a relatively small gap or because of the speed of dispensed build material, for example.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The rheology of the build material is preferably such that a droplet remelts portions of deposited material so as to form a flowable bead.

With respect to the resin portion of the build material, Applicants do not wish to be bound by any one theory, but believe that a resin having hydroxyl functionality, as defined by hydroxyl number, through hydrogen bonding, holds together the ballistic droplet after jetting through the jetting head. The upper limit of hydroxyl number (i.e., 1000) is important in that the higher the hydroxyl number, the higher the heat capacity of the resin, and the resin cools slower.

Slower cooling is undesirable in that the build material tends to sag if it cools slowly as the article is being built. Exemplary resins include polyester resins, phenolic resins, polyamides, vinyl ester resins, polyurethanes, amino resins, melamine resins, urea resins, epoxy resins, and naturally-derived polymers such as coumarin-indene, shellac, protein and celluosics (e.g., ethyl cellulose, ethyl hydroxy ethyl cellulose, nitro cellulose, etc.), and mixtures thereof.

Suitable polyester resins include practically any esterification product of a polybasic organic acid and a polyhydric alcohol. Polyester resins can also be derived from the esterification of a polycarboxylic acid or anhydride with a polyhydric alcohol. Suitable phenolic resins include practically any reaction product of an aromatic alcohol with an aldehyde. Particularly preferred, are the phenolic resins prepared by the reaction of phenol with formaldehyde. Suitable vinyl ester resins include practically any reaction product of an unsaturated polycarboxylic acid or anhydride with an epoxy resin. Exemplary epoxies include virtually any reaction product of a polyfunctional halohydrin, such as epichlorohydrin, with a phenol or polyhydric phenol. Specific resins include acrylics, styrene-acrylic copolymers and styrene-allyl alcohol copolymers. Typically, the build material includes about 1 to 50 percent of the resin, preferably about 5 to 30 percent, and more preferably about 5 to 15 percent, by weight of the resin.

With respect to the primary aromatic sulfonamide, it is believed that the primary aromatic sulfonamides provide the necessary self adhesion properties to the build material. Suitable aromatic sulfonamides are preferably primary $C_1$ to $C_{15}$ benzenesulfonamides, and most preferably the substitution is alkyl and is at the para position. Exemplary primary aromatic sulfonamides include p-n-ethylbenzenesulfonamide, p-toluenesulfonamide, p-methoxybenzenesulfonamide, p-n-nonylbenzenesulfonamide, p-n-butylbenzenesulfonamide, and mixtures thereof. Typically the build material includes about 1 to 50 percent, preferably about 70 to 90 percent, and more preferably about 75 to 90 percent by weight of one or more of the aromatic sulfonamides. Particularly preferred is a 50/50 mixture of p-toluenesulfonamide and p-n-ethylbenzenesulfonamide.

The build material can include antioxidants (e.g., Ultranox 626 available from Borg Warner Chemicals, Inc.), flexibilizers, magnetic particles, pigments, and fluorescent agents, and other additives, the addition of which is within the skill of one in the art. Dyes can be added to the build material. Suitable dyes include FD & C Blue #1, Neozapon Red 492, Savinyl Black RLS and the like. Another additive could be a secondarily reactive organic compound such as one activated by exposure to UV light. These compounds can be used to provide an article which can be hardened so as to be unmeltable or machinable. Typically, the build material includes from about 1 to 10 percent by weight of the various additives.

Suitable build materials are further described in commonly assigned copending U.S. patent application Ser. No. 08/325,694 the entire disclosure of which is incorporated herein by reference. In addition, other features of the ballistic jetting of build material are further described in commonly assigned copending patent application Ser. Nos. 08/326,015; 08/325,889; and 08/826,004, the entire disclosures of which are incorporated herein by reference.

Figure 3:
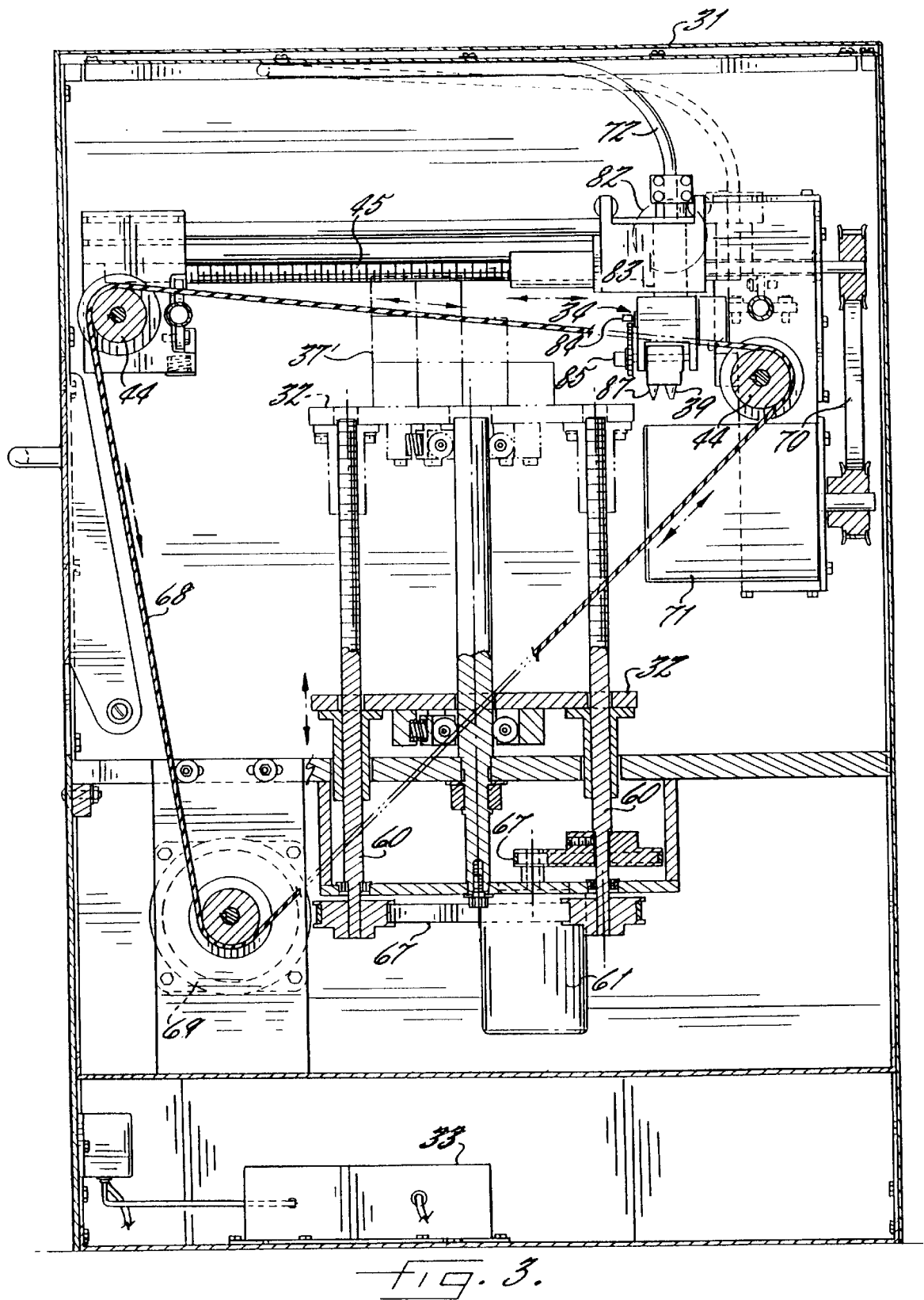
FIG. 3 is a sectional view of the apparatus taken along lines 3—3 of FIG. 2.

In a preferred embodiment, the apparatus 30 includes positioning means for moving the ballistic droplet jetting head 34, including the piezoelectric jet 39 and the thermal normalizing means, such as the illustrated heated body 87 in relation to the platform 32. orthogonal drive shafts facilitate the movement of the jetting head 34 in the X- and Y-directions relative to the platform 32. As illustrated in FIGS. 2 and 3, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the ballistic droplet jetting head 34 in the Y-direction. As will be understood by those having skill in the art, movement of the jetting head 34 in the X- and Y-directions may also be provided by an r/θ positioner including an arm adapted for radial movement at an angle θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Referring more particularly to FIG. 2, liquid build material is supplied from a build material reservoir 78 to the jetting head 34 through the build material delivery hose or conduit 72. The build material reservoir 78 and the delivery conduit 72 both include means for heating the build material so that it remains in a liquid state. In a preferred embodiment, both the build material reservoir 78 and the delivery hose 72 include an electrical heating element (not shown). The build material reservoir 78 also includes a fill tube 79, and a connection to a pneumatic system for applying either vacuum or pressure to the build material. The pneumatic system includes a pump 73, an accumulator 74, a pressure regulator 75, a purge valve 76, and a fill valve 77.

A relatively constant level of liquid build material is maintained in the build material reservoir 78, so that the surface level of the liquid build material in the build material reservoir 78 is maintained at a relatively constant elevation with respect to the piezoelectric jet 39. Dashed lines represent a nearly full liquid level 99 and a nearly empty liquid level 100 of build material in the build material reservoir 78. In preferred embodiments, the jet 39 is situated above the surface level of the liquid build material, and in a most preferred embodiment, the jet 39 is located 1 to 3 inches above the surface level of the liquid build material to maintain a negative meniscus at the orifice of the piezoelectric jet 39.

As illustrated perhaps best in FIGS. 5 and 6, the ballistic droplet jetting head 34 includes means for rotating the piezoelectric jet 39 and the body 87 about a horizontal axis. The axis is defined by a horizontal shaft 85 which is driven by an associated motor 84 through drive gears 57 and 58. Accordingly, the firing direction 41 may be adjusted from vertical, as shown in FIG. 5, to near horizontal as shown in FIG. 6. FIGS. 5 and 6 also further illustrate the positioning means which rotates the jetting head 34 about a vertical axis on shaft 83. This rotation is powered by vertical axis rotation motor 82 shown in schematic form.

The jetting head 34 preferably carries both the piezoelectric jet 39 and the heated body 87 for thermal normalization. Both of these elements are heated to a temperature above the melting point of the build material. This heat may be generated by an electrical heating element. In a preferred embodiment, an electrical heater, such as a resistive wire 120, is operatively connected to the body 87. Accordingly, the jet 39 receives heated liquid build material from the delivery hose 72 and maintains the build material in a liquid state prior to jetting. As will be discussed in greater detail with regard to FIGS. 8A–8C, the heated body 87 is used to heat dispensed build material at predetermined intervals during construction of the article.

Liquid build material is supplied to the jet 39 through the build material delivery hose 72. The delivery hose 72 is formed into a spiral coil 86 within the vertical shaft 83. This coil enables rotation of the ballistic droplet jetting head 34 without restricting the flow of build material through the hose 72 and without requiring a rotating seal. The build material flows from the hose 72 through a baffle 88 and a filter 89 to the jet 39.

FIG. 7 illustrates rotation of the ballistic droplet jetting head 34 about the vertical shaft 83. The build material delivery hose 72 enters the jetting head through the shaft 83. By rotating the shaft 83, the entire jetting head 34, including the jet 39 and the heated body 87, may be rotated 360 degrees about a vertical axis by the vertical axis motor 82.

FIGS. 8A–8C illustrate the formation of four vertical wall portions including the process of thermal normalization according to the present invention. A meltable build material is heated so as to form a liquid and is dispensed in liquid form through dispensing means such as the illustrated piezoelectric jet 39, which may ballistically jet the build material. The build material is dispensed in successive layers, first on the platform 32 and then on previously dispensed layers of build material. The build material cools and then solidifies on contact with either the platform 32 or the previously jetted build material.

The build material may preferably be "overbuilt", that is, constructed in a build direction greater than the desired article dimension. For example, an overbuild percentage of 2% may be desirable. Accordingly, it is desirable to normalize the overbuilt surface portions of the article 37 as it is being produced in order to increase the accuracy of the ultimate article. By normalize is meant to shape the article 37 in a predetermined cross-section to known coordinate points relative to a predetermined coordinate system. The normalizing also has the advantage of evening out any surface irregularities. In addition, because the surface is heated and remelted, small cracks or defects in the dispensed build material may be repaired.

FIG. 8A illustrates four wall portions 201A–201D forming a first portion of the article 37. These wall portions were formed by dispensing build material in successive layers. Although vertical building is illustrated, it will be readily appreciated by those skilled in the art, that the build direction may be other than vertical. As each layer of build material is dispensed, the layer cools and solidifies forming a bond with adjacent layers.

It may not be necessary to normalize every layer of build material as it is dispensed. By dispensing a plurality of layers before normalization, processing steps and time may be saved. In preferred embodiments, five to ten layers of build material may be dispensed before initiating a normalization step. In a more preferred embodiment, 21 layers of build material are dispensed between each normalization step. Accordingly, each wall portion 201A–201D is built to a predetermined height 205 determined by the number of layers of dispensed build material before normalizing the upper surface portions 212. Upon reaching the predetermined height 205, the structure is thermally normalized by heating and displacing the dispensed build material along the upper surface portions 212.

In a preferred embodiment, heat is applied to the upper surface portions 212 through a heated body or "ironing pin" 87 having a contact surface 204. The heated body 87 is advanced along a first path 208A parallel to the surfaces to be normalized and in a first, illustratively counterclockwise, direction 208B. As the body 87 is advanced, the previously dispensed and solidified build material is heated causing it to melt and reflow. After the body 87 passes, the build material resolidifies forming a normalized surface 211 which is accurate relative to the predetermined coordinate system. FIG. 8A shows an overbuilt surface portion 212 that has not yet been normalized.

FIG. 8B illustrates four wall portions 202A–202D on the previously normalized wall portions 201A–201D forming a second vertically extending portion of the article 37. In a preferred embodiment, wall portions 202A–202D and wall portions 201A–201D are formed by dispensing an equal number of layers of build material. Again, the layers may be intentionally overbuilt. Accordingly, the heated body 87 is advanced along a second path 209A parallel to the surfaces to be thermally normalized and in a second, illustratively clockwise, direction 209B. As the heated body is advanced, it heats, melts and displaces the previously dispensed and solidified build material.

FIG. 8C illustrates wall portions 203A–203D formed on previously normalized wall portions 202A–202D. In a preferred embodiment, wall portions 203A–203D, wall portions 202A–202D, and wall portions 201A–201D are all formed by dispensing an equal number of layers of build material. An upper surface of each of the wall portions 203A–203D is thermally normalized by advancing the heated body 87 along a third path 210A parallel to the surfaces being normalized and in a third, illustratively counterclockwise, direction 210B. The thermal normalization results in the upper surfaces 211 being at precise dimensions relative to the apparatus coordinate system. While the process of thermal normalization results in a dimensionally accurate surface, this effect may be further enhanced by alternating direction of advancement of the body 87 in successive operations as shown in the sequences of FIGS. 8A to 8C.

Another aspect of the invention is that the build material and the body 87 may be electrically conducting. Accordingly, contact between the body 87 and the build material may be verified by sensing electrical continuity between the body and the dispensed build material. In addition, the body 87 may engage an electrically conductive pad, not shown, adjacent the platform 32 to calibrate the positioning of the body relative to the predetermined coordinates for the apparatus.

FIG. 9 is a sectional view of wall portion 201D and the body 87 which illustrates another aspect of the present invention. The heated body 87 has a contact surface 204 with a generally bulbous shape for contacting the dispensed upper surface portions 212. Where the body 87 contacts the wall portion 201D, the build material adjacent the body is heated, and melts forming a melted or reflowed region 213. As a result of the shape and placement of the contact surface 204, a portion of the build material 214 may be displaced to the inside of the article being formed.

FIG. 9 also illustrates another feature of the invention generally termed offset, wherein the axis of the body 87 is not directly aligned with an axis defined by the wall portion 201D. The offset may be determined to direct melted build material to a predetermined side of a wall portion or to form a desired surface shape for the upper surface of the wall portion.

When the body 87 passes beyond the point on the wall portion illustrated in FIG. 9, the build material which reflowed will solidify taking the shape of the contact portion 204 of the body 87. This shape is illustrated at the interface 215 between the contact surface 204 and the wall portion 201D. Moreover, the displaced material will riot solidify on the outer portion of the article causing any roughness on the otherwise smooth outer surface of the wall.

Yet another feature of the invention is that the body 87 may be withdrawn from the dispensed build material at a predetermined location to thereby a deposit a bead of build material at the location. In particular, the body 87 typically carries a quantity of melted build material on its surface. By withdrawing the body from the article 37 at a predetermined location, such as an inside corner, a bead of melted build material carried by the article may be deposited to form a gusset to reinforce the corner. Those of skill in the art will readily appreciate many other similar variations also contemplated by the invention for depositing a bead of build material.

FIG. 10 illustrates a second sectional view of wall portion 201D and body 87 taken along section line 10 of FIG. 9. As illustrated, the body 87 is advanced along a first path 208A parallel to the surface being normalized and in a direction illustrated by the arrow 208B. Where the contact surface 204 of the body 87 comes into contact with the wall portion 201D, a portion of the dispensed build material adjacent the contact surface melts at region 213. This melted build material cools and solidifies once the body passes, forming a normalized upper surface 211.

In the embodiment illustrated in FIGS. 8, 9, and 10, thermal normalization is performed as the contact surface 204 on the body 87 is brought into contact with the upper surface portion 212 to be normalized at the interface 215. In another embodiment, contact may not be required and a heated body may be positioned in close proximity to a surface portion to be normalized. The heated body thus radiates sufficient heat to cause the surface portions to melt and reflow. This embodiment may have the advantage of not having any build material accumulate on the heated body.

FIGS. 8, 9, and 10 also illustrate the thermal normalization of an upper surface of vertical wall portions. However, it will be understood by those having skill in the art that thermal normalization may be applied to the edge of a wall portion having an orientation other than vertical. For example, the body 87 having a generally bulbous shape has the advantage of providing a generally spherical contact surface 204 when contacting wall portions having orientations ranging from vertical to horizontal.

FIGS. 11A–11D illustrate other bodies having contact surfaces with various shapes. Each of these bodies includes a release coating 221. In a preferred embodiment, the body may comprise an aluminum portion 220 for conducting heat from an electrical heater. The release coating 221 may comprise a layer of teflon to prevent build material from accumulating on the contact surface. In FIG. 11A, the body 222 has contact surface 228 that is generally cylindrical with a rounded tip. The rounded tip contacts the wall portion 226 at contact surface 228 leaving a rounded shape on the wall portion 226 after the build material 213 solidifies.

In FIG. 11B, the body 223 is cylindrical having a contact surface 229 that is planar and generally perpendicular to an axis defined by the cylindrical body. The planar contact surface 229 meets the wall portion 226 at an edge causing a portion of build material 213 to melt and reflow. When the heated body 223 is advanced, the melted build material 213 will solidify forming a planar surface.

In FIG. 11C, the body 224 is cylindrical and the contact surface 230 is planar and canted at a predetermined angle from perpendicular to an axis defined by the cylindrical body. When the body 224 contacts the wall portion 226 at the contact surface 230, a portion of build material 213 melts. When the body 224 advances, the melted and reflowed portion of build material 213 will resolidify forming a shape corresponding to the surface portion 230.

In FIG. 11D, the body 225 has a contact surface 231 with a tubular end portion defining a channel or recess; 227 for contacting the upper surface portions and collecting a portion of the melted build material within the channel. Accordingly, when the contact surface 231 comes in contact with the wall portion 226, a bead 232 of build material is drawn into the channel 227. Also, a portion of build material 213 adjacent the contact surface melts. After the body 225 has passed, the heated portion of build material 213 will solidify forming a smooth and normalized surface of the wall portion 226. In addition, the channel 227 may be extended through the body as shown by the dotted lines 227A so that the channel may be connected to an external source of vacuum, for example, to facilitate removal of melted build material.

FIGS. 12 and 13 illustrate thermal normalization of an edge of a portion of a horizontal wall 240 of the article. The partially completed horizontal wall 240 is supported by vertical walls 241A, 241B and 241C. When the horizontal wall 240 is complete, it will cap the four vertical walls 241A–241D. As shown in FIG. 12, the unfinished horizontal wall portion 240 has an edge or outer surface that may be normalized by advancing the heated body 246 along a path 245 parallel to the surface. As the body 246 is advanced along a path 245 in the illustrated direction 244, the build material is heated, reflows, and then solidifies forming a normalized surface portion 242.

FIG. 14 illustrates the normalization of an edge of a wall portion 250 wherein the wall portion 250 is canted at an angle relative to vertical. In this illustration, the heated body has a generally bulbous shape providing a contact surface 204 having a generally spherical shape at an interface 215 with the wall portion 250. Upon making contact, a portion of the build material 213 reflows and another portion of build material 214 is displaced to a side of the wall 250.

FIG. 15 illustrates another embodiment of a non-contacting version of thermal normalizing means. In this embodiment, radiation indicated by dotted lines 262 is selectively applied to wall portion 263 causing a portion of the build material 267 in the wall portion to melt and reflow. The radiation may be infrared radiation or laser radiation as would be readily understood by those skilled in the art. In a preferred embodiment, a radiation source 264 supplies radiation 262 through radiation conducting means, such as a fiber optic cable 260. The fiber optic cable can be surrounded by a protective jacket 261. In a preferred embodiment, the radiation conducting means is advanced along a path 266 parallel to the surface being normalized and in a direction illustrated by the arrow 265. The conducting means 260 is oriented so as to selectively transmit radiation 262 towards the surface being normalized. Where the radiation 262 intersects the wall portion 263, a portion of the build material 267 melts or reflows.

In the illustrated embodiment, a single body 87 is shown; however, in view of the positioning means having five degrees of freedom, more than one body could be carried by the apparatus. For example, bodies having differently shaped contact surfaces could be readily accommodated. The positioning means, under control of the processor, could readily select and position a desired body for a desired task.

In the illustrated embodiment, the terms heating and melting have been generally used as relating to melting solid build material to a liquid state; however, those of skill in the art will readily appreciate that the solid build material may be heated to vaporize the build material to thereby displace build material. Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making a three-dimensional article based upon article defining data, said apparatus comprising
    a platform;
    a movable build material dispensing head adjacent said platform and comprising at least one build material jet for dispensing solidifiable build material upon said platform to construct the article in successive layers based upon the article defining data; and
    a heated body carried by said movable build material dispensing head and being disposed in spaced relation from said at least one build material jet for dimensionally normalizing portions of dispensed build material by heating and displacing predetermined portions thereof during construction of the article;
    said heated body having at least one portion defining a channel for facilitating removal of heated build material.

2. An apparatus according to claim 1 wherein said at least one build material jet comprises means for ballistically jetting a plurality of droplets of build material.

3. An apparatus according to claim 1 further comprising positioning means for positioning said movable build material dispensing head so that said heated body is advanced along a predetermined path of travel.

4. An apparatus according to claim 3 wherein said positioning means comprises means for moving said build material dispensing head and thus said heated body in three directions relative to said platform.

5. An apparatus according to claim 4 wherein said positioning means further comprises means for rotating said dispensing head and thus said heated body about two axes relative to said platform thereby defining five degrees of freedom of movement.

6. An apparatus according to claim 3 further comprising a processor operatively connected to said positioning means; and wherein said processor comprises means for controlling said positioning means to position said movable build material dispensing head so that said heated body displaces melted build material to a predetermined side of a portion of the article being constructed.

7. An apparatus according to claim 3 further comprising a processor operatively connected to said positioning means; and wherein said processor comprises means for controlling said positioning means to position said movable build material dispensing head so that said heated body withdraws from a predetermined portion of dispensed build material to deposit a bead of melted build material carried by said heated body onto the predetermined portion of dispensed build material.

8. An apparatus according to claim 3 further comprising a processor operatively connected to said positioning means; and wherein said processor comprises means for controlling said positioning means to position said movable material dispensing head so that said heated body is advanced in alternating predetermined paths of travel in successive operations.

9. An apparatus according to claim 1 wherein said heated body has a contact surface with a generally bulbous shape.

10. An apparatus according to claim 1 wherein the at least one portion defining a channel for facilitating removal of heated build material comprises a tubular end portion.

11. An apparatus according to claim 1 wherein said heated body is cylindrical.

12. An apparatus according to claim 1 wherein said heated body has a contact surface with a predetermined shape for forming a corresponding shape on predetermined portions of dispensed build material; and wherein said predetermined shape of the contact surface is planar and generally perpendicular to an axis defined by said body.

13. An apparatus according to claim 1 wherein said heated body has a contact surface with a predetermined shape for forming a corresponding shape on predetermined portions of dispensed build material; and wherein the contact surface is planar and is canted at a predetermined angle from perpendicular to an axis defined by said heated body.

14. An apparatus according to claim 1 further comprising a release coating on a contact surface of said heated body.

15. An apparatus for making a three-dimensional article based upon article defining data, said apparatus comprising:
    a platform;
    at least one build material jet for dispensing solidifiable build material to construct the article in successive layers on said platform based upon the article defining data;
    positioning means for positioning said at least one build material jet relative to said platform; and
    a heated body carried by said positioning means and disposed in spaced relation from said at least one build material jet for dimensionally normalizing portions of the article during construction thereof by heating and displacing predetermined portions of dispensed build material during construction of the article;
    said heated body having at least one portion defining a channel for facilitating removal of heated build material.

16. An apparatus according to claim 15 wherein said at least one build material jet comprises means for ballistically jetting a plurality of droplets of build material.

17. An apparatus according to claim 15 wherein said positioning means comprises means for moving said heated body in three directions relative to said platform.

18. An apparatus according to claim 17 wherein said positioning means further comprises means for rotating said heated body about two axes relative to said platform thereby defining five degrees of freedom of movement.

19. An apparatus according to claim 15 further comprising a processor operatively connected to said positioning means; and wherein said processor comprises means for controlling said positioning means to position said heated body for displacing melted build material to a predetermined side of a portion of the article being constructed.

20. An apparatus according to claim 15 further comprising a processor operatively connected to said positioning means; and wherein said processor comprises means for controlling said positioning means to position said heated body for withdrawing from a predetermined portion of dispensed build material to deposit a bead of melted build material carried by said heated body onto the predetermined portion of dispensed build material.

21. An apparatus according to claim 15 further comprising a processor operatively connected to said positioning means; and wherein said processor comprises means for controlling said positioning means to position said heated body for advancing in alternating predetermined paths of travel in successive operations.

22. An apparatus according to claim 15 wherein said heated body has a contact surface with a generally bulbous shape.

23. An apparatus according to claim 15 wherein the at least one portion defining the channel for facilitating removal of heated build material comprises a tubular end portion.

24. An apparatus according to claim 15 wherein said heated body is cylindrical.

25. An apparatus according to claim 15 wherein said heated body has a contact surface with a predetermined shape for forming a corresponding shape on predetermined portions of dispensed build material; and wherein said predetermined shape of the contact surface is planar and generally perpendicular to an axis defined by said body.

26. An apparatus according to claim 15 wherein said heated body has a contact surface with a predetermined shape for forming a corresponding shape on predetermined portions of dispensed build material; and wherein the contact surface is planar and is canted at a predetermined angle from perpendicular to an axis defined by said heated body.

27. An apparatus according to claim 15 further comprising a release coating on a contact surface of said heated body.

* * * * *

UNITED STATES PATENT AND TRADEMARK OFFICE
CERTIFICATE OF CORRECTION

PATENT NO. : 5,969,971
DATED : October 19, 1999
INVENTOR(S) : Robert B. BROWN; Charles F. KIRSCHMAN; Herbert E. MENHENNETT It is certified that error appears in the above-indentified patent and that said Letters Patent is hereby corrected as shown below:

Column 7, line 63  Strike: " and 08/826,004,"
          Insert: - -and 08/326,004, "

Column 8, line 2   Strike: "orthogonal"
          Insert: - -Orthogonal- -

Column 12, line 8  Strike: "recess; 227"
          Insert: - -recess 227- -

Signed and Sealed this

Third Day of April, 2001

Attest:

NICHOLAS P. GODICI

Attesting Officer    Acting Director of the United States Patent and Trademark Office